United States Patent
Lefevere et al.

(12)

(10) Patent No.: US 11,147,027 B2
(45) Date of Patent: Oct. 12, 2021

(54) METHOD FOR MANAGING OPTIMAL TRANSMISSION POWER OF A WI-FI ACCESS POINT

(71) Applicant: SAGEMCOM BROADBAND SAS, Rueil-Malmaison (FR)

(72) Inventors: Philippe Lefevere, Rueil Malmaison (FR); Didier Thouvenin, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 16/764,109

(22) PCT Filed: Nov. 16, 2018

(86) PCT No.: PCT/EP2018/081529
§ 371 (c)(1),
(2) Date: May 14, 2020

(87) PCT Pub. No.: WO2019/096980
PCT Pub. Date: May 23, 2019

(65) Prior Publication Data
US 2020/0389857 A1    Dec. 10, 2020

(30) Foreign Application Priority Data
Nov. 20, 2017  (FR) ...................... 1760913

(51) Int. Cl.
*H04W 52/36*  (2009.01)
*H04W 52/14*  (2009.01)
(Continued)

(52) U.S. Cl.
CPC ....... *H04W 52/367* (2013.01); *H04W 52/146* (2013.01); *H04W 52/246* (2013.01); *H04W 52/283* (2013.01)

(58) Field of Classification Search
CPC ............ H04W 52/143; H04W 52/241; H04W 52/367; H04W 52/246
(Continued)

(56) References Cited

U.S. PATENT DOCUMENTS 10,742,709 B2 * 8/2020 Krishnaswamy ... H04L 12/1827
2004/0202243 A1  10/2004 Lin et al.
(Continued)

FOREIGN PATENT DOCUMENTS

WO        03/039024 A2    5/2003

OTHER PUBLICATIONS

Jan. 28, 2019 International Search Report issued in International Patent Application No. PCT/EP2018/081529.

*Primary Examiner* — John J Lee
(74) *Attorney, Agent, or Firm* — Oliff PLC; R. Brian Drozd

(57) ABSTRACT

A method is provided for managing an optimal transmission power of a Wi-Fi access point. Electronic devices are connected to the Wi-Fi access point, and the Wi-Fi access point is able to transmit with a variable transmission power. The method is executed by the Wi-Fi access point and includes the steps of determining a minimum value of a quality indicator associated with a connection of an electronic device to the Wi-Fi access point. A minimum transmission power value of the access point is determined making it possible to obtain, for the electronic device connected to the Wi-Fi access point, a value of the quality indicator associated with the connection thereof to the Wi-Fi access point higher than the minimum value. The optimal transmission power of the Wi-Fi access point is configured as being equal to the minimum transmission power determined.

8 Claims, 3 Drawing Sheets

(51) Int. Cl.
*H04W 52/24* (2009.01)
*H04W 52/28* (2009.01)

(58) Field of Classification Search
USPC .............. 455/522, 69, 41.2, 41.3, 3.01, 41.1
See application file for complete search history.

(56) References Cited

U.S. PATENT DOCUMENTS

2016/0037536 A1* 2/2016 Hamzeh ................ H04L 1/0011
　　　　　　　　　　　　　　　　　　　370/329
2017/0150455 A1* 5/2017 Li ........................ H04W 52/143

* cited by examiner

METHOD FOR MANAGING OPTIMAL TRANSMISSION POWER OF A WI-FI ACCESS POINT

The present invention relates to the field of communication networks. The invention relates more particularly to the field of Wi-Fi (standing for "Wireless Fidelity") wireless communication networks, that is to say ones in conformity with one of the standards promulgated by the IEEE 802.11 group (Institute of Electrical and Electronics Engineers).

Figure 1:
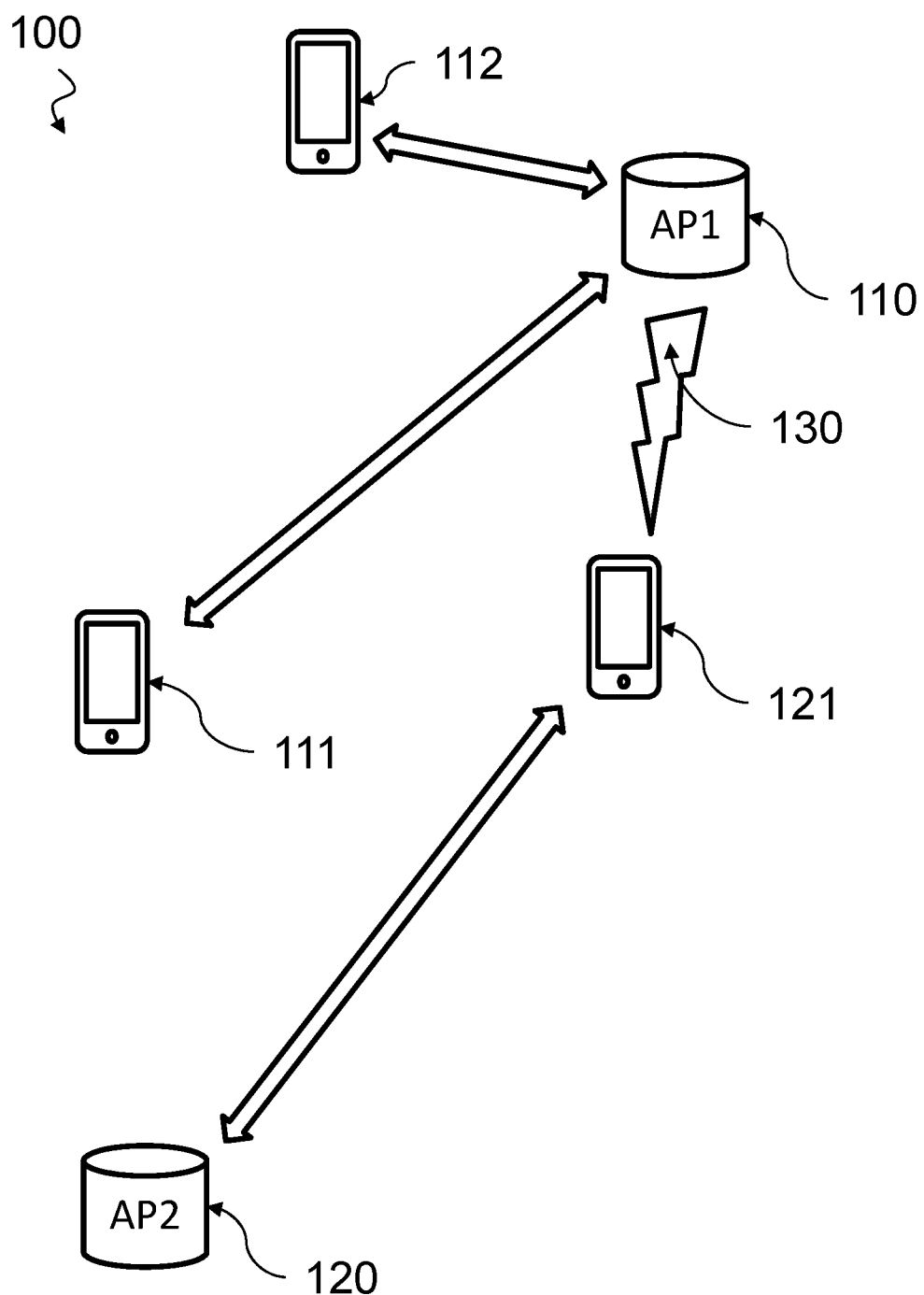

FIG. 1 illustrates schematically a Wi-Fi communication network 100 comprising Wi-Fi access points AP1 110 and AP2 120 and electronic devices 111, 112 and 121 connected to these Wi-Fi access points. In the example in FIG. 1, the electronic devices 111 and 112 are connected to the Wi-Fi access point AP1 110, and the electronic device 121 is connected to the Wi-Fi access point AP2 120.

The Wi-Fi access points AP1 110 and AP2 120 are typically routers comprising a Wi-Fi radio module. The Wi-Fi access point AP1 110 or AP2 120 may also be a box or gateway, or an STB (set-top box), supplied by an internet access provider (or IAP). A box typically comprises an ADSL (asymmetric digital subscriber line) modem or so-called fibre optic modem, routing functionalities and a Wi-Fi radio module. A TV set-top box may also comprise a Wi-Fi radio module in order to allow a wireless connection of electronic devices to the TV set-top box. Thus a Wi-Fi radio module makes it possible to connect electronic devices, such as the electronic devices 111, 112 and 121, to the Wi-Fi access points AP1 110 and AP2 120. The electronic devices 111, 112 and 121 are typically smartphones, tablets, portable computers or any electronic device comprising a Wi-Fi radio module. The electronic device 111, 112 or 121 may be a TV set-top box connected to a Wi-Fi access point such as a box of an internet access provider.

There exists a functionality making it possible to configure, or adjust, the transmission power of the Wi-Fi radio signal of a Wi-Fi access point. This functionality is however little used in the Wi-Fi access points, and very often, when it is used, it is not used by the users. This is because, for performance reasons, it is simpler to allow a Wi-Fi access point to transmit at the maximum transmission power thereof. This makes it possible in fact to obtain maximum radio coverage and to obtain a maximum data transmission rate.

There are however cases where it would be desirable to reduce, or at least to optimise, the transmission power of a Wi-Fi access point such as the Wi-Fi access points AP1 110 or AP2 120.

First of all, in general, it would be desirable to reduce the radio transmissions of any radio equipment to the maximum possible extent in order to reduce any problem for persons deemed to be electrosensitive.

Next, as illustrated in FIG. 1, the Wi-Fi access point AP1 110, when it transmits, is a source of interference 130 for the Wi-Fi connection existing between the Wi-Fi access point AP2 120 and the electronic device 121. Reducing the transmission power of the Wi-Fi access point AP1 110 would therefore make it possible to reduce the interference 130 and therefore to improve the quality of connection between the electronic device 121 and the Wi-Fi access point AP2 120. However, at the same time, reducing the transmission power of the Wi-Fi access point AP1 110 or AP2 120 has the consequence of reducing the quality of the connection between the Wi-Fi access point AP1 110 or AP2 120 and the electronic devices connected to this Wi-Fi access point. This is because the quality of connection, in the direction from Wi-Fi access point to electronic device, is closely related to the signal to noise ratio of the radio connection and therefore to the power of transmission of the Wi-Fi radio signal by the Wi-Fi access point. It is therefore not possible to reduce the transmission power of a Wi-Fi access point with impunity without at any moment disturbing the quality of the Wi-Fi connections of the electronic devices connected to this Wi-Fi access point. In other words, when a plurality of Wi-Fi access points coexist, each Wi-Fi access point is potentially a source of interference for the other Wi-Fi access points. At the same time, reducing a transmission power of a Wi-Fi access point in order to limit the interference may degrade the quality of the connections of the electronic devices connected to this same Wi-Fi access point.

It is therefore necessary to propose a method for overcoming these drawbacks.

The invention relates to a method for managing an optimal transmission power of a Wi-Fi access point, an electronic device being connected to the Wi-Fi access point, the Wi-Fi access point being able to transmit with a variable transmission power, the method being executed by the Wi-Fi access point and comprising the steps of:

determining a minimum value of a quality indicator associated with a connection of an electronic device to the Wi-Fi access point, determining a minimum transmission power value of the access point making it possible to obtain, for the electronic device connected to the Wi-Fi access point, a value of the quality indicator associated with its connection to the Wi-Fi access point higher than the minimum value, configuring the optimal transmission power of the Wi-Fi access point as being equal to the minimum transmission power value determined.

According to a complementary embodiment of the invention, a plurality of electronic devices being connected to the Wi-Fi access point, the step of determining a minimum transmission power value of the access point being performed for each electronic device, the method comprises a subsequent step of determining a maximum value of the transmission power from among the plurality of minimum values determined, this maximum value then making it possible to obtain, for each electronic device connected to the Wi-Fi access point, a value of the quality indicator associated with its connection to the Wi-Fi access point higher than the minimum value, the optimal transmission power of the Wi-Fi access point being equal to the maximum transmission power value determined.

According to a complementary embodiment of the invention, the method comprises a step of selecting, from among the plurality of electronic devices, electronic devices for which the steps of the method are performed.

According to a complementary embodiment of the invention, at least one electronic device being associated with a plurality of positions, the step of determining a minimum transmission power value of the access point making it possible to obtain, for the electronic device, a value of the quality indicator associated with its connection to the Wi-Fi access point higher than the minimum value, is performed for each of the positions associated with the electronic device.

According to a complementary embodiment of the invention, the step of determining the minimum transmission power value comprises the steps of:

configuring the transmission power of the Wi-Fi access point at a current transmission power value, the current transmission power value being equal to a maximum transmission power value, determining, for at least the electronic device connected to the Wi-Fi access point, a value of the quality indicator associated with the connection thereof to the Wi-Fi access point, if the value of the quality indicator determined is higher than the minimum value of the quality indicator determined previously, then configuring the current transmission power of the Wi-Fi access point by reducing it by a predetermined value and returning to the previous step in order to determine a new value of the quality indicator, otherwise, if the value of the quality indicator determined is lower than the minimum value of the quality indicator determined previously, then determining the minimum transmission power value of the Wi-Fi access point as being equal to the current transmission power increased by the predetermined value.

The invention also relates to a Wi-Fi access point adapted to determine an optimal transmission power, the Wi-Fi access point being able to transmit with a variable transmission power, an electronic device being connected to the Wi-Fi access point, the Wi-Fi access point being adapted:

to determine a minimum value of a quality indicator associated with a connection of an electronic device to the Wi-Fi access point, to determine a minimum transmission power value of the access point making it possible to obtain, for the electronic device connected to the Wi-Fi access point, a value of the quality indicator associated with the connection thereof to the Wi-Fi access point higher than the minimum value, to configure the optimal transmission power of the Wi-Fi access point as being equal to the minimum transmission power value determined.

According to a complementary embodiment of the invention, a plurality of electronic devices being connected to the Wi-Fi access point, the Wi-Fi access point is adapted:

to determine a minimum transmission power value of the access point for each electronic device, to determine a maximum value of the transmission power from among the plurality of minimum values determined, this maximum value then making it possible to obtain, for each electronic device connected to the Wi-Fi access point, a value of the quality indicator associated with the connection thereof to the Wi-Fi access point higher than the minimum value, the optimum transmission power of the Wi-Fi access point being equal to the maximum transmission power value determined.

According to a complementary embodiment of the invention, at least one electronic device being associated with a plurality of positions, the Wi-Fi access point is adapted to determine, for each position of the electronic device, a minimum transmission power value making it possible to obtain, for the electronic device, a value of the quality indicator associated with the connection thereof to the Wi-Fi access point higher than the minimum value.

According to a complementary embodiment of the invention, at least one electronic device connected to the Wi-Fi access point being associated with a plurality of positions, the Wi-Fi access point is adapted to determine, for each of the positions associated with the electronic device, a minimum transmission power value making it possible to obtain, for the electronic device, a value of the quality indicator associated with the connection thereof to the Wi-Fi access point higher than the minimum value.

According to a complementary embodiment of the invention, the Wi-Fi access point is adapted, in order to determine the minimum transmission power value:

to configure the transmission power at a current transmission power value, the current transmission power value being equal to a maximum transmission power value, to determine, for at least the electronic device connected, a value of the quality indicator associated with the connection thereof to the Wi-Fi access point, if the value of the quality indicator determined is higher than the minimum value of the quality indicator determined previously, then to configure the current transmission power by reducing it by a predetermined value and returning to the previous step in order to determine a new value of the quality indicator, otherwise, if the value of the quality indicator determined is lower than the minimum value of the quality indicator determined previously, then to determine the minimum transmission power value as being equal to the current transmission power increased by the predetermined value.

The invention also relates to a computer program comprising instructions for implementing, by a processor of a Wi-Fi access point, a method allowing a selection of a so-called optimal frequency band among the plurality of frequency bands, when the computer program is executed by the processor.

The invention also relates to a computer program comprising instructions for implementing, by a processor of a Wi-Fi access point, a method for managing an optimal transmission power of a Wi-Fi access point, the Wi-Fi access point being able to transmit with a variable transmission power, when the computer program is executed by the processor.

The invention also relates to a recording medium on which the above computer program is stored.

Figure 2:
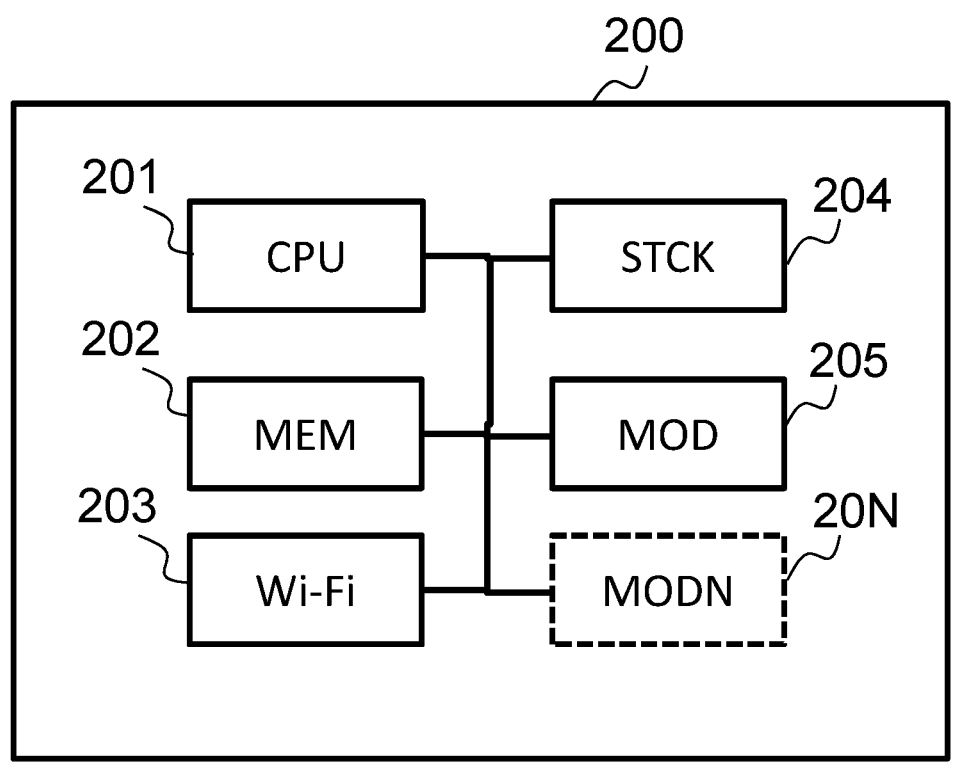
Figure 3:
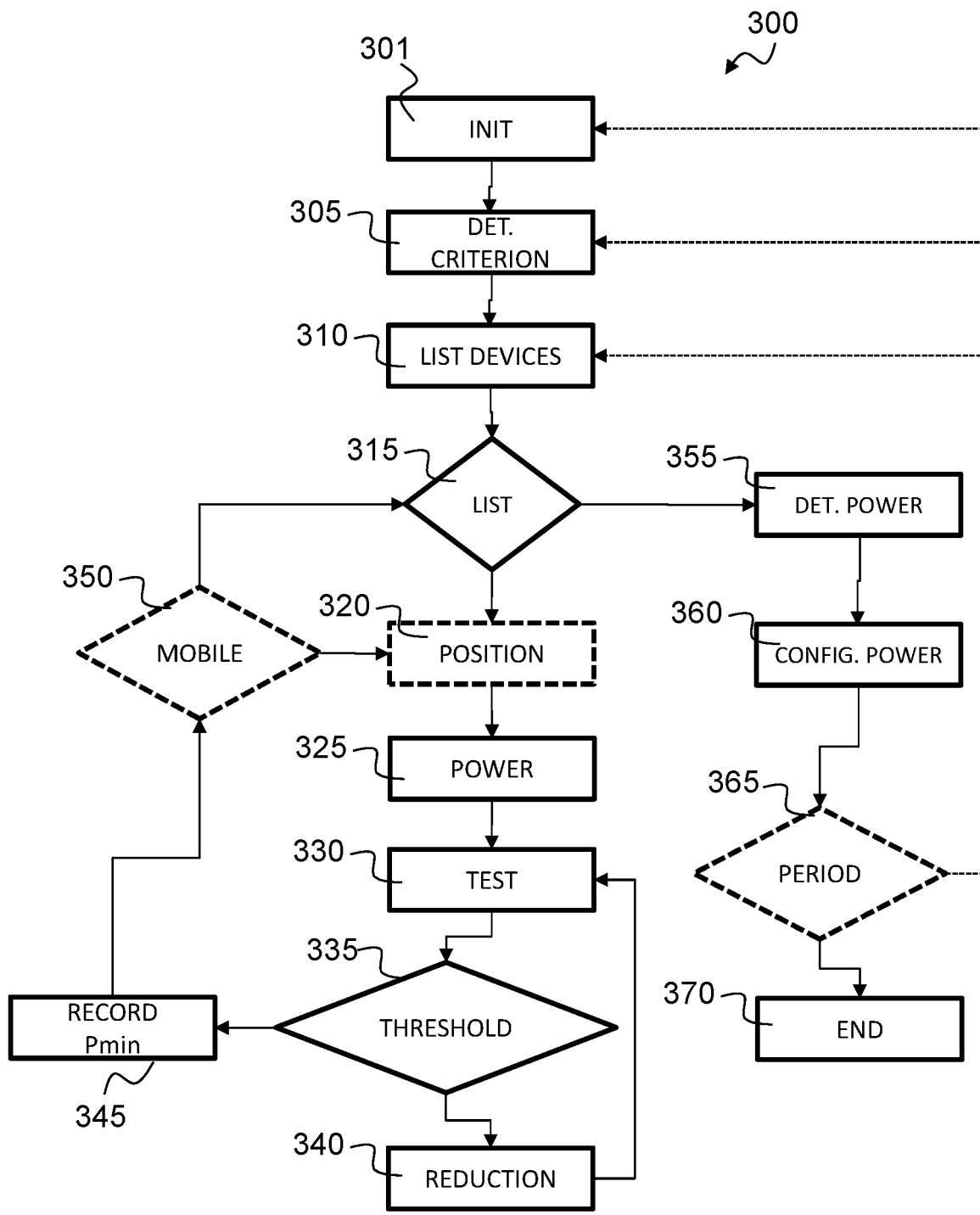

The features of the invention mentioned above, as well as others, will emerge more clearly from a reading of the following description of an example embodiment, said description being given in relation to the accompanying drawings, among which:

FIG. 1 illustrates schematically a Wi-Fi communication network comprising Wi-Fi access points and electronic devices connected to these Wi-Fi access points, FIG. 2 illustrates schematically the hardware architecture of a Wi-Fi access point, the Wi-Fi access point being adapted to manage an optimal transmission power of a Wi-Fi access point, according to one embodiment of the invention, FIG. 3 illustrates schematically a method for managing an optimal transmission power of a Wi-Fi access point according to one embodiment of the invention.

The principle of the invention is to reduce a transmission power of a Wi-Fi access point while at the same time checking that a quality of service of a connection between the Wi-Fi access point and an electronic device is preserved. Thus, during a test phase, the transmission power of a Wi-Fi access point is gradually reduced, the Wi-Fi access point checking on each occasion that a target service quality is maintained. Thus the Wi-Fi access point can determine an optimal transmission power making it possible on the one hand to reduce the transmission power and on the other hand to maintain a predetermined quality of service. This principle is explained in more detail below.

FIG. 2 illustrates schematically the hardware architecture of a Wi-Fi access point 200, the Wi-Fi access point 200 being adapted to manage an optimal transmission power of a Wi-Fi access point, according to one embodiment of the invention. The Wi-Fi access point described below is typically a Wi-Fi access point similar to the Wi-Fi access point AP1 110 or AP2 120, when the Wi-Fi access point AP1 110 or AP2 120 is also adapted to implement the method for managing an optimal transmission power of a Wi-Fi access point, according to one embodiment of the invention, for example as illustrated in FIG. 3.

The Wi-Fi access point 200 comprises, connected by a communication bus: a processor or CPU (central processing unit) 201; a memory MEM 202 of the RAM (random access memory) and/or ROM (read only memory) type, a Wi-Fi radio module 203, a storage module STCK 204 of the internal storage type and possibly other modules 205 to 20N of various natures. The storage module STCK 204 may be of the hard disk HDD (hard disk drive) or SSD (solid-state drive) type, or of the external storage medium reader type, such as an SD (Secure Digital) card reader. The processor CPU 201 can record data, or information, in the memory MEM 202 or in the storage module STCK 204. The processor CPU 201 can read data recorded in the memory MEM 202 or in the storage module STCK 204. These data may correspond to configuration parameters, instructions, quality parameters related to messages received or to information or instructions received for example in a message received via the Wi-Fi radio module 203 (or via another communication module 20N providing a connection to a communication module, for example an Ethernet or ADSL network module). The Wi-Fi radio module 203 provides the connection of the electronic device 300 to the mesh communication network 100 via a shared medium, for example an electricity network. The Wi-Fi radio module 203 can allow the connection of the Wi-Fi access point 200 with an electronic device such as a smartphone, a tablet, a TV set-top box or more globally any electronic device comprising a Wi-Fi radio module. The Wi-Fi radio module 203 enables the Wi-Fi access point 200 to send, and respectively to receive, messages intended for, and respectively coming from, one or more electronic devices connected to the Wi-Fi access point 200. Typically, the Wi-Fi access point 200 manages a parameter called service set identifier (hereinafter SSID) making it possible to identify a wireless communication network created by the Wi-Fi access point 200. It is thus commonly said that an electronic device wishing to connect to the Wi-Fi access point 200 connects to the Wi-Fi network identified by the SSID of the Wi-Fi access point 200. Possibly the Wi-Fi access point 200 is adapted to implement an authentication method, for example of the WPA2 (Wi-Fi Protected Access) type.

The processor CPU 201 is capable of executing instructions loaded in the memory MEM 202, for example from the storage module STCK 204 or from a communication network via a network module 20N. When the Wi-Fi access point 200 is powered up, the processor CPU 201 is capable of reading instructions from the memory MEM 202 and executing them. These instructions form a computer program causing the implementation, by the processor CPU 201, of all or some of the methods and steps described below, particularly in the description of FIG. 3. Thus all or some of the methods and steps described below can be implemented in software form by the execution of a set of instructions by a programmable machine, such as a DSP (digital signal processor) or a microcontroller. All or some of the methods and steps described here may also be implemented in hardware form by a machine or a dedicated component, such as an FPGA (field-programmable gate array) or an ASIC (application-specific integrated circuit). The functions of the Wi-Fi access point 200 may be integrated in an existing Wi-Fi access point, or any electronic device comprising a Wi-Fi radio module, by the updating of software (the updating of firmware).

FIG. 3 illustrates schematically a method 300 for managing an optimal transmission power of a Wi-Fi access point, for example similar to the Wi-Fi access point 200, according to one embodiment of the invention.

The steps of the method 300 may be executed by the CPU 201 of the Wi-Fi access point 200.

In a first step 301, the method 300 is initiated. This step 300 may be executed following the action of a user or automatically. The step 301 may be executed automatically, for example, as described below, because the method 300 is periodically executed. Alternatively, the step 301 may be triggered following a particular event. For example, this event may be a detection, by the Wi-Fi access point 200, of the presence of a particular connected electronic device, or the reception of a message, coming from a particular connected electronic device, comprising a request for execution of the method 300. Thus the method 300 may be triggered remotely by a user of an electronic device connected to the Wi-Fi access point 200. Such a particular electronic device may send a message initialising the method 300 when it itself detects an event, for example a change in its position or location.

According to a complementary embodiment, a Wi-Fi access point, for example the Wi-Fi access point AP1 110 adapted, that is to say modified, to implement the method 300, may be in communication with another Wi-Fi access point, for example the Wi-Fi access point AP2 120 adapted, that is to say modified, to implement the method 300. Thus the two Wi-Fi access points AP1 110 and AP2 120, adapted to implement the method 300, can synchronise themselves in order to implement the method 300 in a coordinated manner.

In a following step 305, the Wi-Fi access point 200 determines a minimum value of a quality indicator associated with a connection of an electronic device to the Wi-Fi access point. According to the embodiment of the invention, the quality indicator used may be different. The quality indicator may thus be:
- a signal to noise ratio of a connection between the Wi-Fi access point and an electronic device,
- a technical parameter associated with a connection between the Wi-Fi access point and an electronic device, for example the "Modulation and Coding Scheme" (MCS) parameter negotiated at the time of the connection between an electronic device and the Wi-Fi access point,
- a data transmission rate associated with the connection between the Wi-Fi access point and an electronic device.

In the case where the quality indicator is a data transmission rate, and since it is a question in the end of configuring the transmission power of the Wi-Fi access point, the quality indicator corresponds to the data transmission rate in the direction Wi-Fi access point to electronic device, that is to say in the so-called download direction. This quality indicator may require having recourse to a step of testing the download rate between an electronic device and the Wi-Fi access point in order to be determined. The step 305 merely serves to fix a minimum value of the quality indicator, a value that serves as a threshold value, that is to say the transmission power of the Wi-Fi access point is called on to be decreased while ensuring that the quality indicator of a connection between an electronic device and the Wi-Fi access point remains higher than the minimum value determined at the step 305. In the case of the presence of a plurality of electronic devices, the transmission power of the Wi-Fi access point is called on to be decreased while ensuring that the quality indicator of the connection between each electronic device selected and the Wi-Fi access point remains higher than the minimum value determined in the step 305.

In order to determine the minimum value of the quality indicator, the Wi-Fi access point may integrate for example a web server enabling a user of an electronic device to connect in order to have access to a page for configuring the minimum value of the quality indicator. The user may also install an application on an electronic device connected to the Wi-Fi access point 200, for example downloaded from an applications store of the Google Play™ type, the application making it possible to configure the Wi-Fi access point 200 remotely.

The choice of the minimum value of the quality indicator may be made by the user according to predetermined parameters, each predetermined value being associated with a possible service through the connection to the Wi-Fi access point 200. Thus the user may indicate which service level he wishes to be able to use, for example "voice over IP", "SD video" (SD standing for standard definition) or "HD video" (HD standing for high definition), each service level being associated with a minimum transmission rate in the download direction in order to be used comfortably.

In a following step 310, the Wi-Fi access point determines a list of electronic devices for which the following steps of the method 300 will be performed. In other words, in this step 310, the Wi-Fi access point selects the electronic devices for which compliance with the minimum value of the quality indicator previously determined is satisfied.

According to an alternative embodiment of the invention, the Wi-Fi access point 200 performs the following steps with all the electronic devices connected to the Wi-Fi access point 200.

According to another embodiment of the invention, the method 300 may comprise an intermediate step (not shown) enabling a user to select, manually or in accordance with predefined criteria, the electronic devices for which the following steps must be performed. The application installed on an electronic device may comprise an interface allowing this choice.

According to another embodiment of the invention, the Wi-Fi access point 200 automatically determines, in accordance with predefined criteria, the connected electronic devices for which the following steps must be performed. The Wi-Fi access point 200 can thus select the electronic devices according to the MAC (media access control) address, the IP (Internet Protocol) address or a name of the DNS (domain name server) type associated with the electronic device. The MAC or IP address or addresses or DNS names that are to be selected, or on the contrary excluded, can be predetermined or configured by a user. Another criterion may be used. Thus an electronic device connected to the Wi-Fi access point 200 may send to the latter a predetermined message, the predetermined message enabling the Wi-Fi access point 200 to select said electronic device when the method 300 is performed. Thus some electronic devices connected to the Wi-Fi access point may be dedicated to the implementation of the method 300.

In a following step 315, the Wi-Fi access point 200 checks that the following steps of the method 300 are indeed performed for all the electronic devices selected during the step 310. For each electronic device selected, the Wi-Fi access point 200 next passes to the step 320 or 325 according to the embodiment of the invention, the step 320 being optional. Once all the electronic devices selected have been tested, then the Wi-Fi access point 200 passes to the step 355. In other words, at least one minimum transmission power value of the Wi-Fi access point 200 making it possible to guarantee the maintenance of the minimum value of the quality indicator, associated with the connection thereof to the Wi-Fi access point 200, determined during the step 305, was determined for each electronic device selected, and possibly for each position of said electronic device. Possibly, as explained below in the description of the steps 320 and 350, the Wi-Fi access point 200 may determine a plurality of minimum transmission power values of the Wi-Fi access point 200 making it possible to guarantee the maintenance of the minimum value of the quality indicator for an electronic device, each value corresponding to a different position, or location, of this same electronic device. Each test making it possible to determine the value of the quality indicator is therefore performed successively, according to the position of the electronic device.

The steps 320, 325, 330, 335, 340, 345 and 350 are performed successively by the Wi-Fi access point 200 for each of the electronic devices selected in the step 310. The following description therefore applies to each electronic device selected successively.

In the optional following step 320, the Wi-Fi access point 200 determines a position of the electronic device. This position may be determined solely by the Wi-Fi access point, for example according to the received power of the radio signal coming from the electronic device and the directivity of said signal. The position may also be determined according to a message received from the electronic device, the message typically comprising GPS (Global Positioning System) coordinates of the electronic system. According to a complementary embodiment of the invention, the position of the electronic device may be determined by triangulation, a plurality of access points then being able to cooperate in order to determine the position of each electronic device. According to one embodiment of the invention, the electronic device executes an application enabling a user of the electronic device to indicate or validate a position of the electronic device.

In the following step 325, the Wi-Fi access point 200 configures the transmission power of said Wi-Fi access point 200 at a current transmission power value, the current transmission power value being equal to a maximum transmission power value of said Wi-Fi access point 200. In other words, in this step 325, the Wi-Fi access point 200 configures the transmission power thereof to its maximum value.

In the following step 330, the Wi-Fi access point 200 determines, for the connected electronic device, a value of the quality indicator associated with the connection thereof to the Wi-Fi access point 200. According to the embodiment of the invention, the quality indicator may be determined according to a technical parameter associated with the connection between the electronic device and the Wi-Fi access point 200 or may require the performance of a test on the connection. For example, the Wi-Fi access point 200 may perform a test on the data bitrate of the connection established between the electronic device and the Wi-Fi access point 200. In order to perform this test, it may be necessary to install an application on the electronic device in advance, for example downloaded from an applications store of the Google Play™ type. This application may be the same as the application for triggering the method 300 described in the step 301. According to one embodiment of the invention, it is possible to perform a test on the bitrate of the connection without having to install any specific application on the electronic device. Thus the Wi-Fi access point 200 may send a plurality of frames via the UDP (User Datagram Protocol, as defined by RFC 768). Each UDP frame being acknowledged by the electronic device, the Wi-Fi access point 200 may count the number of acknowledgements received in a given time in order to estimate the bitrate of the connection. The estimation of the bitrate of the connection by the Wi-Fi access point 200 is then made according to the number of acknowledgements received in a given time and the size of each UDP frame sent. According to a complementary embodiment of the invention, the Wi-Fi access point 200 may perform the test on the bitrate of the connection by means of a tool such as "iPerf" (a tool downloadable on https://iperffr/). This tool can thus function in "client-server" mode if a client (that is to say an "iPerf" client application) is installed on the electronic device, or if not according to the mode previously described via the use of UDP frames if no client is installed on the electronic device. At the end of the step 330, the Wi-Fi access point 200 has thus determined a value of the quality indicator associated with the connection of the Wi-Fi access point 200 with an electronic device, and potentially also associated with the position of the electronic device.

In a following step 335, the Wi-Fi access point 200 compares this value of the quality indicator determined during this previous step 330 with the minimum value of the quality indicator determined during the step 305. If the value of the quality indicator determined during the step 330 is higher than the minimum value determined during the step 305, this means that the current transmission power of the Wi-Fi access point 200 is sufficient to ensure the connection quality required. In this case, in a step 340, the Wi-Fi access point 200 configures the current transmission power of the Wi-Fi access point 200 by reducing it by a predetermined value, and then recommences the test of the step 330. In other words, if the current transmission power makes it possible to ensure a value of the quality indicator determined during the step 330 higher than the minimum value determined during the step 305, then the Wi-Fi access point 200 reduces its current transmission value by a predetermined power, referred to as "deltaP", and recommences the test of the step 330. Thus, by incrementally reducing its current transmission power, the Wi-Fi access point 200 can determine up to what value it is possible to reduce the transmission power while ensuring maintenance of the minimum value of the quality indicator.

After each test 330 performed, the Wi-Fi access point 200 thus checks whether the value of the quality indicator determined during the step 330 is higher than the minimum value determined during the step 305. In the case where the value of the quality indicator determined during the step 330 becomes lower than the minimum value determined during the step 305, then the current transmission power, used during the last test 330, no longer makes it possible to guarantee the maintenance of the quality indicator. The Wi-Fi access point 200 then passes to the step 345, in order to record the value of the minimum transmission power, referred to as "Pmin", making it possible, for the electronic device tested, and potentially in association with the current position thereof, to maintain the value of the quality indicator. This value Pmin is typically equal to the current transmission power increased by the predetermined value deltaP, since the last test of the step 330 performed, with the current power, failed. It is therefore necessary to choose, as the minimum power, the current power corresponding to the penultimate test of the step 330. During the step 345, the Wi-Fi access point 200 records, for each electronic device selected and then tested, and possibly for each position of said electronic device, a minimum transmission power value making it possible to guarantee the maintenance of the quality indicator.

During the following step 350, the Wi-Fi access point checks whether it is necessary, for the electronic device selected, to conduct tests for a plurality of positions of this electronic device. If so, then the Wi-Fi access point 200 recommences the steps 320, 325, 330, 335, 340 and 345 for a new position of the electronic device. If not, then the Wi-Fi access point 200 passes to the step 315 and selects another electronic device from the list of electronic devices selected in order to conduct, on this new electronic device selected, the steps 320, 325, 330, 335, 340 and 345.

If during the step 315 the Wi-Fi access point 200 finds that the electronic devices selected in the step 310 have been tested, potentially some on a plurality of positions, then the Wi-Fi access point 200 passes to the step 355. During the step 355, the Wi-Fi access point 200 determines a minimum transmission power of the Wi-Fi access point 200 making it possible to guarantee, for all the electronic devices selected, and for possibly each position of these electronic devices, that the value of the quality indicator is higher than the minimum value of the quality indicator required, that is to say determined during the step 305. This minimum value of the transmission power of the Wi-Fi access point 200 is equal to the highest of all the minimum transmission power values recorded during the step 345. In other words, the minimum transmission power of the Wi-Fi access point 200 making it possible to guarantee the maintenance of the value of the quality indicator, for all the connections of the electronic devices, possibly at each position, is equal to the maximum value of the minimum power values recorded during the step 345.

In a following step 360, the Wi-Fi access point 200 configures the optimal transmission power of the Wi-Fi access point 200 as being equal to the minimum transmission power determined during the previous step 355. Thus, by configuring the transmission power thereof to this minimum value, the Wi-Fi access point 200 guarantees that all the connections to the electronic devices selected allow maintenance of the quality indicator and at the same time that the transmission power of the Wi-Fi access point has indeed been reduced to the minimum. This makes it possible to reduce the transmission power of the Wi-Fi access point 200, with the following benefits:

- a minimum quality of service preserved, as configured during the step 305,
- a reduction of the transmitted power, and consequently of the electrical consumption of the Wi-Fi access point 200,
- a reduction of the possible interferences caused by the Wi-Fi access point 200 (reduction of the interferences 130 in FIG. 1),
- a global reduction of electromagnetic radiation.

In a step 365, the Wi-Fi access point checks whether it must recommence the execution of the method 300 or end same (step 370). The method 300 may thus be configured so as to be reproduced periodically. The method 300 may alternatively be configured after detection of a particular event or after reception of a message comprising a command to execute the method 300.

According to a complementary embodiment of the invention, the method 300 may be executed in parallel by a plurality of Wi-Fi access points, such as for example the Wi-Fi access points AP1 110 and AP2 120. In this case, synchronisation mechanisms can be established between the Wi-Fi access points. Typically, when a Wi-Fi access point executes the method 300, it can send a message to the other Wi-Fi access points in order to warn them of the execution of the method 300. According to one embodiment of the invention, a Wi-Fi access point may integrate, in a message of the "beacon" type (as defined in the standard 802.11), broadcast by said Wi-Fi access point, information intended for the other Wi-Fi access points. The information, possibly integrated in a so-called "vendor specific" field of a message of the "beacon" type, may inform of the start and/or end of execution of the method 300. In this case, any Wi-Fi access point receiving this information, for example via a message of the "beacon" type, waits until it receives a message indicating the end of execution of the method 300 before possibly executing the method in its turn. The synchronisation method may warn of the exchange of a "token" in order to manage the sequencing of the execution of the method 300 between the various Wi-Fi access points.

According to a complementary embodiment of the invention, a particular electronic device known as "tag" is adapted to the implementation, by a Wi-Fi access point, of the method 300. The electronic device or "tag" is thus adapted for:
- automatically connecting to a predetermined wireless network, identified for example by an SSID, of a Wi-Fi access point, thus establishing a connection with said Wi-Fi access point,
- sending a message to said Wi-Fi access point, the message identifying the electronic devices being a "tag",
- sending a message to the Wi-Fi access point comprising a command for executing the method 300, automatically, periodically or on detection of an event.

According to a complementary embodiment, the electronic device or "tag" can collect information of the received power type coming from other electronic devices connected to the same wireless network or to another wireless network. The method 300 may be modified so that the step 330 of testing the value of the quality indicator is performed by the so-called "tag" electronic device rather than by the Wi-Fi access point executing the method 300. The so-called "tag" electronic device and the Wi-Fi access point can thus cooperate in order to offset the measurement of a quality indicator onto the so-called "tag" electronic device rather than on the Wi-Fi access point. The so-called "tag" electronic device can possibly connect to one or more wireless networks (each wireless network being identified by an SSID) in order to launch the execution of the method 300 for managing the optimal transmission power of each Wi-Fi access point.

The invention claimed is:

1. A method for managing an optimal transmission power of a Wi-Fi access point, plural electronic devices being connected to the Wi-Fi access point, at least one electronic device being associated with a plurality of positions, the Wi-Fi access point being configured to transmit with a variable transmission power, wherein said method causes the Wi-Fi access point to perform steps comprising:
   determining a minimum value of a quality indicator associated with a connection for each of the plural electronic devices to the Wi-Fi access point,
   for each of the plurality of positions associated with each access point electronic device including the at least one device, determining a minimum transmission power value of the access point in order to obtain, for the electronic device connected to the Wi-Fi access point, a value of the quality indicator associated with its connection to the Wi-Fi access point higher than the minimum value,
   configuring the optimal transmission power of the Wi-Fi access point as being equal to the minimum transmission power values previously determined.

2. The method according to claim 1, the method causing the Wi-Fi access point to further perform:
   determining a maximum value of the transmission power from among the plurality of minimum values determined in order obtain, for each electronic device connected to the Wi-Fi access point, a value of the quality indicator associated with its connection to the Wi-Fi access point higher than the minimum value, the optimal transmission power of the Wi-Fi access point being equal to the maximum transmission power value determined.

3. The method according to claim 2, the causing the Wi-Fi access point to perform selecting, from among the plurality of electronic devices, electronic devices for which the method is performed.

4. The method according to claim 1, the determining the minimum transmission power value comprising:
   configuring the transmission power of the Wi-Fi access point at a current transmission power value, the current transmission power value being equal to a maximum transmission power value of the access point,
   determining, for at least the electronic device connected to the Wi-Fi access point, a value of the quality indicator associated with the connection thereof to the Wi-Fi access point,
   if the value of the quality indicator determined is higher than the minimum value of the quality indicator determined previously, then configuring the current transmission power of the Wi-Fi access point by reducing it by a predetermined value and returning to the previous step in order to determine a new value of the quality indicator,
   otherwise, if the value of the quality indicator determined is lower than the minimum value of the quality indicator determined previously, then determining the minimum transmission power value of the Wi-Fi access point as being equal to the current transmission power increased by the predetermined value.

5. A computer program product comprising a non-transitory recording medium storing instructions for implementing, by a processor of a Wi-Fi access point, a method for managing an optimal transmission power of a Wi-Fi access point according to claim 1, when the instructions are executed by the processor.

6. A Wi-Fi access point adapted to determine an optimal transmission power, the Wi-Fi access point being configured to transmit with a variable transmission power, a plurality of electronic devices being connected to the Wi-Fi access point, at least one electronic device being associated with a plurality of positions, the Wi-Fi access comprises circuitry configured to causes the Wi-Fi access point:
   to determine a minimum value of a quality indicator associated with a connection for each of the plural electronic devices to the Wi-Fi access point,
   for each of the plurality of positions associated with the at least one electronic device including the at least one device, to determine a minimum transmission power value of the access point in order to obtain, for the electronic device connected to the Wi-Fi access point, a value of the quality indicator associated with the connection thereof to the Wi-Fi access point higher than the minimum value, and to configure the optimal transmission power of the Wi-Fi access point as being equal to the maximum value of the minimum transmission power value determined.

7. The Wi-Fi access point according to claim 6, a plurality of electronic devices being connected to the Wi-Fi access point, the Wi-Fi access point comprises circuitry further configured to causes the Wi-Fi access point:

to determine a minimum transmission power value of the access point for each electronic device, to determine a maximum value of the transmission power from among the plurality of minimum values determined in order to obtain, for each electronic device connected to the Wi-Fi access point, a value of the quality indicator associated with the connection thereof to the Wi-Fi access point higher than the minimum value, the optimum transmission power of the Wi-Fi access point being equal to the maximum transmission power value determined.

8. The Wi-Fi access point according to claim 7, the Wi-Fi access point being adapted, in order to determine the minimum transmission power value:

to configure the transmission power at a current transmission power value, the current transmission power value being equal to a maximum transmission power value of the access point, to determine, for at least the electronic device connected, a value of the quality indicator associated with the connection thereof to the Wi-Fi access point, if the value of the quality indicator determined is higher than the minimum value of the quality indicator determined previously, then to configure the current transmission power by reducing it by a predetermined value and returning to the previous step in order to determine a new value of the quality indicator, otherwise, if the value of the quality indicator determined is lower than the minimum value of the quality indicator determined previously, then to determine the minimum transmission power value as being equal to the current transmission power increased by the predetermined value.

\* \* \* \* \*